US008214398B1

(12) United States Patent
Cowan et al.

(10) Patent No.: US 8,214,398 B1
(45) Date of Patent: Jul. 3, 2012

(54) ROLE BASED ACCESS CONTROLS

(75) Inventors: S. Crispin Cowan, Portland, OR (US); Seth R. Arnold, Portland, OR (US); Steven M. Beattie, Portland, OR (US); John R. Johansen, Portland, OR (US); Jesse D. Michael, Portland, OR (US); Anthony N. Jones, Portland, OR (US)

(73) Assignee: EMC Corporation, Hopkinton, MA (US)

(*) Notice: Subject to any disclaimer, the term of this patent is extended or adjusted under 35 U.S.C. 154(b) by 381 days.

(21) Appl. No.: 11/355,097

(22) Filed: Feb. 15, 2006

Related U.S. Application Data

(60) Provisional application No. 60/653,809, filed on Feb. 16, 2005.

(51) Int. Cl.
*G06F 17/30* (2006.01)

(52) U.S. Cl. ......................... 707/785; 707/787; 707/788

(58) Field of Classification Search .................. 707/785
See application file for complete search history.

(56) References Cited

U.S. PATENT DOCUMENTS 4,918,653 A 4/1990 Johri et al.
5,664,206 A 9/1997 Murow et al.
5,713,024 A 1/1998 Halladay
5,721,824 A 2/1998 Taylor
5,732,212 A 3/1998 Perholtz et al.
5,748,890 A * 5/1998 Goldberg et al. ................. 726/2
5,835,777 A 11/1998 Staelin
5,894,571 A 4/1999 O'Connor
5,901,227 A 5/1999 Perlman
5,950,010 A 9/1999 Hesse et al.
5,961,593 A 10/1999 Gabber et al.
6,144,959 A 11/2000 Anderson et al.
6,205,579 B1 3/2001 Southgate
6,256,774 B1 7/2001 O'Leary et al.
6,282,711 B1 8/2001 Halpern et al.
6,301,707 B1 10/2001 Carroll et al.
6,324,691 B1 11/2001 Gazdik
6,353,926 B1 3/2002 Parthesarathy et al.
6,367,075 B1 4/2002 Kruger et al.
6,421,777 B1 7/2002 Pierre-Louis et al.
6,457,130 B2 9/2002 Hitz et al.
6,460,060 B1 10/2002 Maddalozzo et al.
6,493,871 B1 12/2002 McGuire et al.
6,539,473 B1 3/2003 Hubacher et al.
6,539,539 B1 3/2003 Larsen et al.

(Continued)

FOREIGN PATENT DOCUMENTS

GB 2419711 5/2006

OTHER PUBLICATIONS

Tanenbaum, Andrew S., Modern Operating Systems; 2nd ed.; 2001; Prentice Hall, Upper Saddle River, NJ; pp. 753-757.

(Continued)

*Primary Examiner* — Charles Rones
*Assistant Examiner* — Mellissa M Chojnacki
(74) *Attorney, Agent, or Firm* — Barry N. Young

(57) ABSTRACT

Role-based access controls improve user access in a computer system. A profile associated with a role is generated. The profile is enforced with respect to one or more users associated with the role. Optionally, the profile is generated based at least in part on a user interaction.

18 Claims, 8 Drawing Sheets

U.S. PATENT DOCUMENTS 6,606,744 B1 8/2003 Mikurak
6,615,406 B1 9/2003 Amberg et al.
6,651,085 B1 11/2003 Woods
6,725,452 B1 4/2004 Te'eni et al.
6,728,711 B2 4/2004 Richard
6,735,757 B1 5/2004 Kroening et al.
6,775,829 B1 8/2004 Kroening
6,785,822 B1 * 8/2004 Sadhwani-Tully ............. 726/28
6,799,208 B1 9/2004 Sankaranarayan et al.
6,892,382 B1 5/2005 Hapner et al.
6,928,644 B1 8/2005 Kroening et al.
6,981,028 B1 12/2005 Rawat et al.
7,006,993 B1 2/2006 Cheong et al.
7,013,461 B2 3/2006 Hellerstein et al.
7,016,959 B2 3/2006 Dinh et al.
7,051,327 B1 5/2006 Milius et al.
7,055,149 B2 5/2006 Birkholz et al.
7,093,247 B2 8/2006 Ashworth et al.
7,143,067 B1 11/2006 Cheston et al.
7,177,859 B2 2/2007 Pather et al.
7,181,768 B1 2/2007 Ghosh et al.
7,185,047 B1 2/2007 Bate et al.
7,222,218 B2 5/2007 Dutt et al.
7,251,812 B1 7/2007 Jhanwar et al.
7,272,815 B1 9/2007 Eldridge et al.
7,284,243 B2 10/2007 Burgess
7,302,634 B2 11/2007 Lucovsky et al.
7,350,075 B1 3/2008 Eastham
7,353,533 B2 4/2008 Wright et al.
7,356,679 B1 4/2008 Le et al.
7,398,480 B2 7/2008 Zimniewicz et al.
7,398,524 B2 7/2008 Shapiro
7,424,617 B2 9/2008 Boyd et al.
7,478,381 B2 1/2009 Roberts et al.
7,506,337 B2 3/2009 Iyer
7,506,338 B2 3/2009 Alpern et al.
7,539,978 B1 5/2009 Haddox et al.
7,546,594 B2 6/2009 McGuire et al.
7,571,427 B2 8/2009 Wang et al.
7,574,706 B2 8/2009 Meulemans et al.
7,853,609 B2 12/2010 Dehghan et al.
2001/0023440 A1 9/2001 Franklin et al.
2001/0029605 A1 10/2001 Forbes et al.
2002/0007330 A1 1/2002 Kumar et al.
2002/0007380 A1 1/2002 Bauchot et al.
2002/0010757 A1 1/2002 Granik et al.
2002/0019879 A1 2/2002 Jasen et al.
2002/0100036 A1 7/2002 Moshir et al.
2002/0147974 A1 10/2002 Wookey
2002/0156877 A1 10/2002 Lu et al.
2002/0162030 A1 10/2002 Brezak et al.
2003/0014656 A1 1/2003 Ault et al.
2003/0061202 A1 3/2003 Coleman
2003/0115292 A1 6/2003 Griffin et al.
2003/0121024 A1 6/2003 Hill et al.
2003/0126214 A1 7/2003 Oliszewski
2003/0131073 A1 7/2003 Lucovsky et al.
2003/0149759 A1 8/2003 Hetherington et al.
2003/0172127 A1 9/2003 Northrup et al.
2003/0182414 A1 9/2003 O'Neill
2003/0195970 A1 10/2003 Dinh et al.
2003/0200149 A1 10/2003 Gonzalez et al.
2003/0217123 A1 11/2003 Anderson et al.
2003/0221190 A1 11/2003 Deshpande et al.
2004/0003266 A1 1/2004 Moshir et al.
2004/0006710 A1 1/2004 Pollutro et al.
2004/0015946 A1 1/2004 Te'eni et al.
2004/0025048 A1 * 2/2004 Porcari et al. ................. 713/200
2004/0049697 A1 3/2004 Edwards, Jr. et al.
2004/0098594 A1 * 5/2004 Fleming et al. ............... 713/182
2004/0102182 A1 5/2004 Reith et al.
2004/0196981 A1 10/2004 Nakano et al.
2004/0205748 A1 10/2004 Iyer
2004/0254976 A1 12/2004 Malik et al.
2004/0255291 A1 12/2004 Sierer et al.
2005/0002057 A1 1/2005 Oe
2005/0005152 A1 1/2005 Singh et al.
2005/0081055 A1 4/2005 Patrick et al.
2005/0097353 A1 5/2005 Patrick et al.
2005/0120054 A1 6/2005 Shulman et al.
2005/0125677 A1 6/2005 Michaelides
2005/0132179 A1 6/2005 Glaum et al.
2005/0132349 A1 6/2005 Roberts et al.
2005/0134896 A1 6/2005 Koga
2005/0246588 A1 11/2005 Deng et al.
2006/0021065 A1 1/2006 Kamperman et al.
2006/0047657 A1 * 3/2006 Frieder et al. ..................... 707/9
2006/0059359 A1 3/2006 Reasor et al.
2006/0090208 A1 4/2006 Smith
2006/0123101 A1 * 6/2006 Buccella et al. .............. 709/223
2006/0123414 A1 6/2006 Fors et al.
2006/0137000 A1 6/2006 Isaacson
2006/0155838 A1 7/2006 Wu et al.
2006/0161553 A1 * 7/2006 Woo ................................ 707/10
2006/0218544 A1 9/2006 Chakraborty et al.
2006/0230124 A1 * 10/2006 Belfiore et al. ............... 709/219
2006/0259964 A1 * 11/2006 Maldonado et al. ............ 726/16
2006/0265597 A1 11/2006 Carey et al.
2006/0277542 A1 12/2006 Wipfel
2007/0006205 A1 1/2007 Kennedy et al.
2007/0111726 A1 5/2007 Lambert et al.
2011/0004580 A1 * 1/2011 Varghese ........................ 706/47

OTHER PUBLICATIONS

Forrest, Stephanie, et al., "Computer Immunology," vol. 40, No. 10, Oct. 1997, ACM, pp. 88-96.
Garfinkel, et al., Practical Unix & Internet Security, ISBN 1-56592-148-8, Chpt. 3.1, 3.2, 4.1, 4.2, Second Ed., Apr. 1996.
Tanenbaum, Andrew S., "Computer Networks," Prentice Hall 1996, Third Edition, pp. 29, 44.
Fusco, John, "The Linux Programmer's Toolbox," Chapter 5, "What Every Developer Should Know about the Kernel," pp. 222-224, Prentice Hall 2007.
Nemeth, Evi, et al., "Linux Administration Handbook," Chapter 12—TCP/IP Networking, pp. 276-277, Prentice Hall 2006.
"A Third Phase of Internet Search"; http://getoutfoxed.com/booklprint/46; printed on Aug. 28, 2007; p. 1-2.
"Abstract"; http://getoutfoxed.com/booklprint/36; printed on Aug. 28, 2007; p. 1.
"Beyond Outfoxed"; http://getoutfoxed.com/booklprint/88; printed on Aug. 28, 2007; p. 1.
"Calculating Levels of Trust"; http://getoutfoxed.com/booklprint/112; printed on Aug. 28, 2007; pp. 1-2.
"Comparison to Existing Systems"; http://getoutfoxed.com/booklprint/47; printed on Aug. 28, 2007; pp. 1-3.
"Files & Processes"; http://getoutfoxed.com/booklprint/84; printed on Aug. 28, 2007; p. 1.
"Firefox Help: How to Manage Profiles"; http://www.mozilla.org/supportlfirefoxlprofile; printed on Aug. 27, 2007; pp. 1-4.
"How it Works"; http://getoutfoxed.com/booklprint/87; printed on Aug. 28, 2007; p. 1.
"Keeping Your Network Clean"; http://getoutfoxed.com/booklprint/108; printed on Aug. 28, 2007; p. 1.
"Novell ZENworks 7 Suite: Your Complete Identity-driven IT Resource Management Solution"; Novell, Inc. Product Guide; http://www.novell.com; (2006); pp. 1-11.
"Novell ZENworks Configuration Management: Complete Systems Management to Lower Your Total Cost of Ownership"; Novell, Inc. Product Guide; http://www.novell.com; (2007); pp. 1-11.
"Novell ZENworks Endpoint Security Management: Total Control from a Single Console"; Novell, Inc. Technical White Paper; http://www.novell.com; (2007); pp. 1-11.
"Novell ZENworks Orchestrator Virtual Machine Management Guide 1.1 "; Novell, Inc.; http://www.novell.com; (2007); pp. 1-109.
"Novell ZENworks"; Wikipedia, the free encyclopedia; http://en.wikipedia.org/wiki/ZENworks; Printed on Aug. 28, 2007; pp. 1-3.
"Objections"; http://getoutfoxed.com/booklprint/35; printed on Aug. 28, 2007; p. 1.
"Objections"; http://getoutfoxed.com/booklprint/86; printed on Aug. 28, 2007; p. 1.
"Orchestrating the Data Center with Novell ZENworks"; Novell Solution Flyer; http://www.novell.com; (2007), pp. 1-4.

Tridgell, A. et al., "The rsync algorithm," retrieved at http://www.samba.org/rsync/tech_report/node2.html, Nov. 9, 1998, p. 1.
"Phishing, Spyware, Crapware, Adware"; http://getoutfoxed.com/booklprint/85; printed on Aug. 28, 2007; p. 1.
"Search & Browsing"; http://getoutfoxed.com/booklprint/83; printed on Aug. 28, 2007; p. 1.
"Small World Networks"; http://getouffoxed.com/booklprint/62; printed on Aug. 28, 2007; pp. 1-2.
"Socially Aware Surfing and Shopping"; http://getoutfoxed.com/booklprint/73; printed on Aug. 28, 2007; p. 1.
"Tagging and Folksonomy"; http://getoutfoxed.com/booklprint/96; printed on Aug. 28, 2007; p. 1.
"Three Magic Ingredients"; http://getoutfoxed.com/booklprint/32; printed on Aug. 28, 2007; p. 1.
"What Outfoxed is Not"; http://getoutfoxed.com/booklprint/34; printed on Aug. 28, 2007; p. 1.
"XenFaq—Xen Wiki"; http://www.wiki.xensource.com/xenwiki/XenFaq; printed on Aug. 27,2007; pp. 1-7.
Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p. 1.
Aiken, Peter et al., Microsoft Computer Dictionary; Fifth Edition; Microsoft Press; 2002.
Bailey, E.C., Maximum RPM, Red Hat Inc., 2000, ISBN 1-888172-78-9, http://www.redhat.com/docs/books/max-rpm/index.html, pp. 1-565.
Bhuta et al., "A framework for identification and resolution of interoperability mismatchs in COTS based system", IEEE IWICSS, 2007, pp. 1-6.
Buytaert, Kris, "Linux Virtualization with Xen"; LinuxDevCenter.com; http://www.linuxdevcenter.com/pub/a/linuxl2006/01126/xen.html; Jan. 26, 2006; pp. 1-3.
Chapman et al., "Contemplating systemic software reuse in project centric company", ACM SAICSIT, 2008, pp. 16-26.
Clark, Bryan, "A Moment of Xen: Virtualize Linux to Test Your Apps"; IBM.com; http://www-128.ibm.com/ developerworks/linuxIlibrary/I-xen/; Mar. 15, 2005; pp. 1-6.
Gill et al., "Resuability issued in component based development", ACM, 2003, pp. 1-5.
James, Stan; "Outfoxed in a Nutshell"; http://getoutfoxed.com/nutshell; printed on Aug. 28, 2007; pp. 1-3.
James, Stan; "Outfoxed in a Nutshell: What does Outfoxed add to my Browser?"; http://getoutfoxed.com/nutshell/ node/106; printed on Aug. 28, 2007; pp. 1-3.
James, Stan; "What is Outfoxed?"; http://getoutfoxed.com/about; printed on Aug. 28, 2007; pp. 1-2.
Lymer et al., "Experience in using business scenarios to access COTS components in integrated solutions", ACM, 2005, pp. 1-15.
Newham, C. et al., "Learning the Bash Shell," 2nd Ed., O'Reilly & Associates, 1998, p. 13.
Silva, G.N., APT HOWTO, Chapter 5—Getting Information about packages, Aug. 2001, http://web.archive.org/web/20010911133902/http://www.debian.org/doc/manuals/apt-howto-ch-sourcehandling.en.html.
Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.
Rosen, Rami, "Introduction to the Xen Virtual Machine"; LinuxJournal.com; http://www.linuxjournal.com/article/8540; Sep. 1, 2005; pp. 1-10.
YourDictionary.com, Remote boot, retrieved on Jan. 5, 2010 from https:///www.yourdictionary.com/computer/remote-boot.
Crispin Cowan, Seth Arnold, Steve Beattie, Chris Wright, WIREX and John Viega, Secure Software; *Immunix & Defcon: Defending Vulnerable Code From Intense Attack*; Apr. 23, 2003; IMMUNIX; USA.
Crispin Cowan, Steve Beattie, Greg Kroah-Hartman, Calton Pu, Perry Wagle, and Virgil Gligor—WireX Communications, Inc.; *SubDomain: Parsimonious Server Security*; Proceeding of the 14$^{th}$ Systems Administration Conference; Dec. 3-8, 2000; The USENIX Association, USA.
Crispin Cowan, Seth Arnold, Steve Beattie, and Chris Wright, WIREX Communications, Inc. & John Viega, Secure Software Inc.; *Defcon Capture the Flag: Defending Vulnerable Code from Intense Attack*; USA.

* cited by examiner

```
302 ~/bin/hrbash {
     #include <standard/base>
310  #include <standard/consoles>
     #include <standard/nameservice>

     /bin/hrbash ~308                      308 ~ rx,
304  /usr/sbin/useradd                           rx,  306
     /usr/sbin/userdel                           rx,
}
```

Fig. 3A

```
312 ~/bin/helpbash {
     #include <standard/base>
     #include <standard/consoles>
     #include <standard/nameservice>

     /bin/helpbash                               rx,
     /usr/bin/passwd                             rx,
     /usr/sbin/usermod                           rx,
}
```

Fig. 3B

```
314 ~/bin/userbash {
     #include <standard/base>
     #include <standard/consoles>
     #include <standard/nameservice>

     /bin/userbash                               rx,
316  /usr/sbin/useradd                           rx,
     /usr/sbin/userdel                           rx,
318  /usr/bin/passwd                             rx,
     /usr/sbin/usermod                           rx,
}
```

Fig. 3C

```
316 ~/bin/combash {
     #include <standard/base>
     #include <standard/consoles>
     #include <standard/nameservice>

     /bin/combash                                rx,
     /bin/hrbash                                 rx,
     /bin/helpbash                               rx,
}
```

Fig. 3D

```
/usr/bin/passwd {
  #include <standard/base>
  #include <standard/nameservice>
  #include <standard/authentication>
  #include <standard/consoles>                 408
  /etc/.pwd.lock                      w,
402 /etc/npasswd                      rwl,
404 /etc/nshadow                      rwl,
  /etc/passwd*                        rwl,
406 /etc/pwd.*                        rwl,
  /etc/pwdb.conf                      r,
  /etc/shadow*                        rwl,
  /etc/spwd.*                         rwl,
  /usr/lib/cracklib_dict.hwm          r,
  /usr/lib/cracklib_dict.pwd          r,
  /usr/lib/cracklib_dict.pwi          r,
  /var/run/utmp                       rw,
}
```

Fig. 4A

```
/usr/sbin/useradd {
  #include <standard/base>
  #include <standard/nameservice>
  #include <standard/authentication>
  /etc/default/useradd                r,
  /etc/group*                         rwl,
  /etc/gshadow*                       rwl,
  /etc/login.defs                     r,
  /etc/passwd*                        rwl,
  /etc/.pwd.lock                      rw,
  /etc/shadow*                        rwl,
  /etc/skel                           r,
  /etc/skel/**                        r,
  /home/**                            rw,
  /usr/lib/perl5/**                   r,
  /usr/sbin/adduser                   x,
  /usr/sbin/useradd                   rx,
  /var/log/lastlog                    rw,
  /var/run/nscd.pid                   rw,
  /var/run/utmp                       rw,
  /var/spool/mail/*                   rw,
}
```

Fig. 4B

```
502 - % genprof /bin/hrbash

      Please start the role to be profiled in another window and exercise
504   its functionality now.  Once completed, select (U)pdate to continue,
      or (F)inish to exit.

             Profiling: /bin/hrbash
             Reading log entries from: /var/log/messages
           506          508
      [(P)arse log] / (F)inish
      Updating profiles in /etc/subdomain.d/
510 ~ -------------------------------------------------------------------
512 ~ Execute: /usr/sbin/useradd
      [(I)nherit] / (P)rofile / (U)nconfined / (D)eny / Abo(r)t / (F)inish)
      514           516         518              520      522       524
526 ~ Execute: /bin/ls
      [(I)nherit] / (D)eny / Abo(r)t / (F)inish)
      528
      ...

530 ~ Capability: chown
      [(A)llow] / (D)eny / Abo(r)t / (F)inish
      532
      Capability: sys_resource
      [(A)llow] / (D)eny / Abo(r)t / (F)inish

      ...

534 ~ Path:     /usr/lib/pwdutils/liblog_syslog.so.1.0.0
      New Mode: r
        1 - /usr/lib/pwdutils/liblog_syslog.so.1.0.0 ~ 540
       [2 - /usr/lib/pwdutils/liblog_syslog.so.*] ~ 536
538   [(A)llow] / (D)eny / (N)ew / (G)lob / Glob w/(E)xt / Abo(r)t /
      (F)inish

542 ~ Path:     /etc/nsswitch.conf
      New Mode: r
       [1 - #include <abstractions/nameservice>] ~ 546
        2 - /etc/nsswitch.conf ~ 544
      [(A)llow] / (D)eny / (N)ew / (G)lob / Glob w/(E)xt / Abo(r)t /
      (F)inish

548 ~ Path:     /etc/passwd.tmp3gt91P
      New Mode: lrw
        1 - /etc/passwd.tmp3gt91P ~ 550
       [2 - /etc/passwd.*] ~ 552
      [(A)llow] / (D)eny / (N)ew / (G)lob / Glob w/(E)xt / Abo(r)t /
      (F)inish
```

Fig. 5

```
     /bin/hrbash {
       #include <abstractions/authentication>
       #include <abstractions/base>
       #include <abstractions/bash>
       #include <abstractions/consoles>
       #include <abstractions/nameservice> ~ 610
       #include <abstractions/wutmp>

606 ~  capability chown,
       capability sys_resource,

       /bin/bash                            ix,
       /bin/hrbash                          ixr,
604 ~  /bin/ls                              ixr,
       /etc/.pwd.lock                       w,
       /etc/default/useradd                 r,
       /etc/group                           lrw,
       /etc/group.*                         lrw,
       /etc/passwd                          lrw,
612 ~  /etc/passwd.*                        lrw,
       /etc/pwdutils/logging                r,
       /etc/shadow                          lrw,
       /etc/shadow.*                        lrw,
       /usr/bin/crontab                     ixr,
       /usr/bin/dircolors                   ixr,
       /usr/bin/passwd                      ixr,
608 ~  /usr/lib/pwdutils/liblog_syslog.so.* r,
602 ~  /usr/sbin/useradd                    ixr,
       /usr/sbin/useradd.local              ixr,
       /usr/sbin/userdel                    ixr,
       /usr/sbin/userdel-post.local         ixr,
       /usr/sbin/userdel-pre.local          ixr,
       /var/log/faillog                     rw,
       /var/spool/cron/deny                 r,
     }
```

Fig. 6

```
/usr/sbin/sshd {        702
...
  ^EXEC {        704
    #include <program-chunks/base-files>
    #include <program-chunks/shells>

    /bin/ash ux,
    /bin/bash ux,
    /bin/bash2 ux,
    /bin/bsh ux,
    /bin/csh ux,
    /bin/ksh ux,
    /bin/sh ux,
    /bin/tcsh ux,
    /bin/zsh ux,
    /sbin/nologin ux,
  }

  ^PRIVSEP {        706
    #include <program-chunks/base-files>
    #include <program-chunks/nameservice-files>

    capability sys_chroot,
    capability setuid,
    capability setgid,
  ...
}
```

Fig. 7

ROLE BASED ACCESS CONTROLS

CROSS REFERENCE TO OTHER APPLICATIONS

This application claims priority to U.S. Provisional Patent Application No. 60/653,809 entitled Enterprise-Wide Access Control Systems filed Feb. 16, 2005 which is incorporated herein by reference for all purposes.

BACKGROUND OF THE INVENTION

Identity management, provided by products such as Novell eDirectory and Microsoft ActiveDirectory can be conceptualized as a database of individual users and one or more credentials that correspond to the users, such as a password. Rudimentary access controls may be enforced by the identity management products, such as by defining that a specific user may read the files in one directory, while another user may not. Similarly, a group of specified users (e.g., Alice, Bob, and Charlie) may be granted permission to modify a particular file, while other users may be granted no access to the file at all. In each case, considerable manual effort is required on the part of an administrator to configure to which resources a user is entitled access, and to what extent access should be granted. One effect is that the resulting access controls may be arbitrarily applied—two users having the same job, requiring the same access to the same files may wind up with different access, depending on which administrator configured their respective accounts.

Additionally, to the extent that access controls are provided by identity management products, they are enforced at the application layer. Thus, it is possible for an attacker to circumvent the access controls imposed by typical identity management tools.

Therefore, it would be desirable to have a better way to secure a computer system.

BRIEF DESCRIPTION OF THE DRAWINGS

Various embodiments of the invention are disclosed in the following detailed description and the accompanying drawings.

FIG. 3A illustrates an embodiment of a profile.

FIG. 3B illustrates an embodiment of a profile.

FIG. 3C illustrates an embodiment of a profile.

FIG. 3D illustrates an embodiment of a profile.

FIG. 4A illustrates an embodiment of a program profile.

FIG. 4B illustrates an embodiment of a program profile.

FIG. 5 illustrates an example interaction with an analyzer.

FIG. 6 illustrates an embodiment of a profile.

FIG. 7 illustrates a portion of an embodiment of a program profile.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
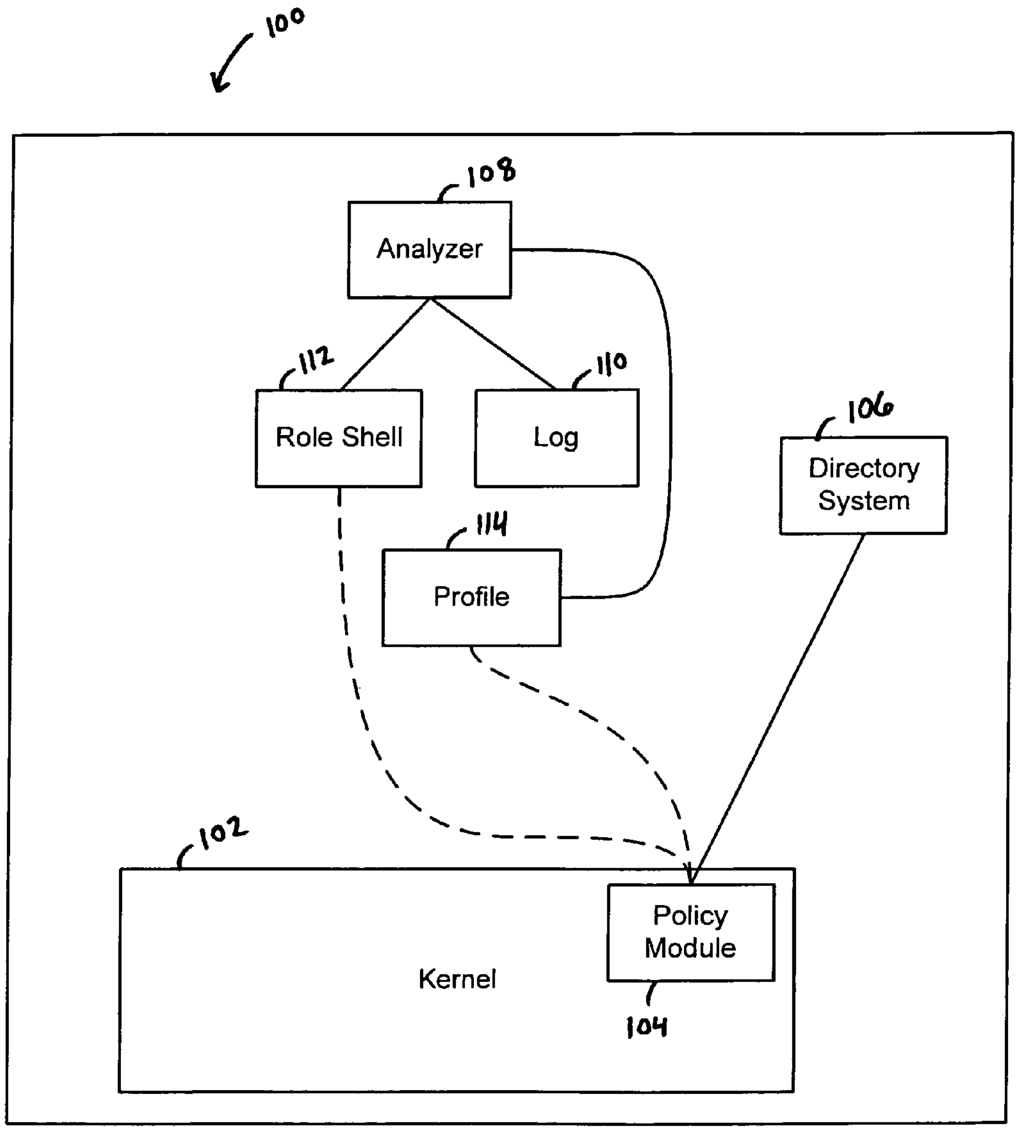
FIG. 1A is a block diagram illustrating an embodiment of a system having role based access controls.

FIG. 1A is a block diagram illustrating an embodiment of a system having role based access controls. In the example shown, a kernel 102, a policy module 104, a directory system 106, an analyzer 108, a log 110, a role shell 112, and a profile 114 are included. In this example, system 100 is a SUSE Linux system. The role shell is described herein in terms of the bash command interpreter. Other platforms, such as MICROSOFT WINDOWS may also be used, and the techniques described herein may be adapted as appropriate. Similarly, in this example, policy module 104 is a Linux loadable kernel module. Policy module 104 may be adapted for other architectures as appropriate.

Roles can be created, managed, allocated to users, and removed as organizational needs dictate. Examples of roles include functions, such as "helpdesk," levels of competence, such as "junior system administrator," departments, such as "human resources," and job titles, such as "Chief Financial Officer (CFO)."

Each role may have multiple users associated with it (e.g., users Peter, Jane, and Barbara may all have a "secretary" role), and a user may have multiple roles (e.g., Jack may have all of the following roles: "CFO," "Board of Directors," "Sales," and "Management").

By providing a layer of indirection (i.e., associating a role with a user), if the user's job description ever changes, for example, if the user is promoted, adjusting the user's access to resources can be accomplished quickly and cleanly.

Suppose, for example, that Bob currently works as a junior engineer. He might have a role of "engineer.jr," indicating that he works in the engineering department and is a junior level employee. If Bob joins the sales department as a sales engineer, he will need access to different resources. As a junior engineer, Bob may have had the ability to commit changes to the code base. He may also have had the ability to read system logs, but not to reboot machines—something a senior engineer (with a role of engineer.sr) might be allowed to do. As a sales engineer, he may no longer need commit access, but may need access to new resources, such as customer lists and sales documents. Thus, by revoking Bob's role of engineer.jr and associating him with a new role of "sales.engineer," Bob effectively has immediate access to only those resources which he should have, commensurate with his role. Similarly, new employees could be given a role, "new_hire" that limits their access to resources until they've signed non disclosure agreements or other employment paperwork.

In this example, a role shell 112 is selected for creation and profiled by analyzer 108 to create profile 114. A profile can describe the ability to access files and can also describe permission to do a complex set of operations, and may be specific to the enterprise.

Directory system 106 includes a database of individual users and credentials associated with those users. In some embodiments, directory system 106 is physically separate from system 100. For example, directory system 106 may be a product such as Novell eDirectory or Microsoft ActiveDirectory and modifications may be made, as applicable, to allow for the translation of directory system 106's information into a syntax that system 100 can make use of. As described in more detail below, in various embodiments system 100 controls file access, network access, or both. In various embodiments, profiles control local application and/or user access to local resources, remote resources, or both local and remote resources.

In some embodiments, all of the users defined in directory system 106 are users of system 100. In some embodiments, only a subset of users defined in directory system 106 are users of system 100. This may be the case, for example, in a corporate setting, where employees may have limited access to a web-based email account, but no other access to nodes on the corporate network, where other employees, such as system administrators, may have extensive access to several platforms.

The profiles described herein can be created, installed, and enforced, even for programs, users, and roles that do not yet exist on a given node. Even if those programs, users, and/or roles are subsequently created on the node, the policy will still apply.

Profile 114 is created in some embodiments by starting with a default profile and refining the profile by executing commands and logging the access requests that role shell 112 makes in a log 110. For example, attempts at reading libraries and writing to particular directories are recorded in log 110. In some embodiments, profile 114 is generated at least in part by having a user knowledgeable about the legitimate tasks a user having a role with which the profile is associated is and/or may be required to perform, such as a trusted or monitored holder of the role, another user knowledgeable about the role and legitimate activities performed by users having the role, an administrator using a predetermined (e.g., scripted) set of operations identified as being associated with the role, etc., and have such a user perform such tasks using role shell 112. Analyzer 108 evaluates log 110 and interacts with an administrator to determine an appropriate set of rules to cover the logged behavior.

A policy module 104 loaded in kernel 102 is configured to enforce the access controls specified in profile 114 against a user that has a role shell 112. The restrictions listed in the profile (also referred to herein as a "policy") typically complement any access controls already provided by the underlying system, also known as native access controls. Thus, for example, any file access must be allowed under both the native access controls, and any controls provided in the profile for access to be granted to the user that has a role shell 112.

A user-level parser (not depicted) reads profiles such as profile 114 from a specified location, such as /etc/subdomain.d/* and converts the textual representation of profiles into kernel data structures. The parser inserts the profiles into kernel 102 by, such as by using a sysctl( ) interface. As described in more detail below, applications may also have profiles.

Relevant system calls (e.g., open, exec, read) are modified to check if the calling process is confined. If so, the request is referred to the policy module for further inspection. When a confined process makes a request that is permitted, the policy module returns normally. When a confined process attempts to perform a file operation that is not permitted, a syscall returns with a permission error. In some embodiments, kernel 102 also generates a syslog entry describing the attempted access violation. This information can be used by a variety of other security features, such as an intrusion detection system, as appropriate.

Figure 1B:
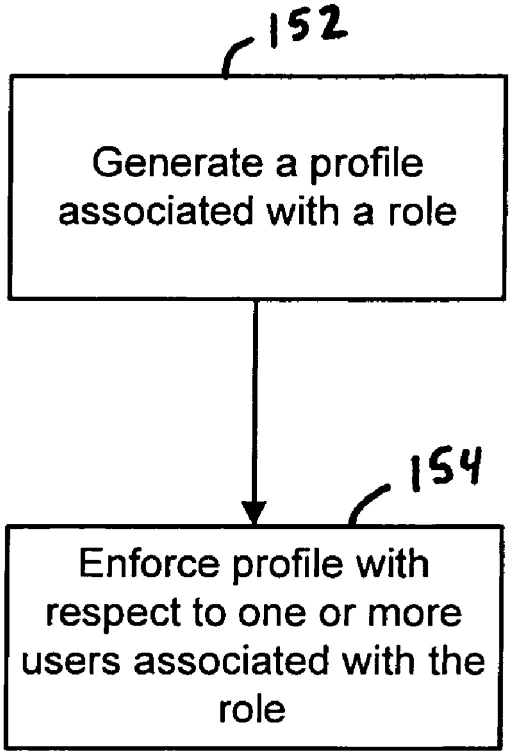
FIG. 1B is a flow chart illustrating an embodiment of a process for providing role based access controls.

FIG. 1B is a flow chart illustrating an embodiment of a process for providing role based access controls. The process begins at 152 when a profile associated with a role is generated. In some embodiments, the profile is created and/or refined at least in part by observing authorized behavior and/or use associated with the role and generating one or more rules to ensure that such observed behavior and/or use are permitted. At 154, the profile is enforced with respect to one or more users associated with the role.

Figure 2:
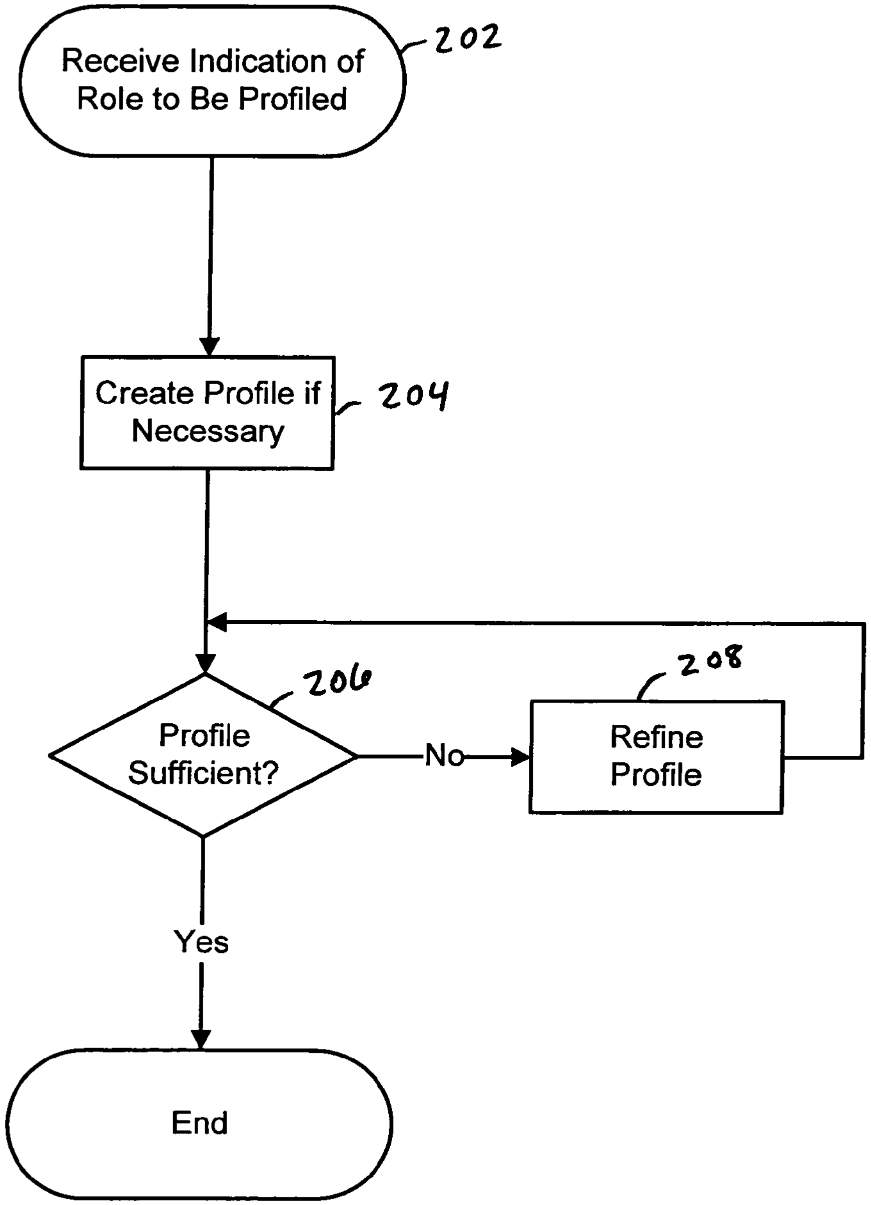
FIG. 2 is a flow chart illustrating an embodiment of a process for creating a profile.

FIG. 2 is a flow chart illustrating an embodiment of a process for creating a profile. In some embodiments portion 152 of FIG. 1B includes the process depicted in FIG. 2. The process begins at 202 when an indication that a role is to be profiled is received. In some embodiments, this is accomplished by an administrator entering a command such as "generate-profile <role>". For example, an administrator could begin at 202 by entering a command such as "generate-profile /bin/hrbash" in a console window, to indicate that the role shell "hrbash" is to be profiled for a human resources role. In other embodiments, other interfaces, such as the YaST graphical user interface, are used in lieu of or in addition to the console, as appropriate.

In some embodiments, an automated method is used to help determine which roles should be profiled. For example, a suggested list of common roles (e.g., basic user, junior administrator, super user) can be presented to an administrator for potential profiling.

At 204, a profile (also referred to as an "initial profile") is created. In some embodiments, if a profile already exists on the system 204 is omitted. In some embodiments, role shells are hard links that point at a standard system shell, such as /bin/bash. If "generate-profile /bin/hrbash" is entered at 202, at 204, it is determined whether /bin/hrbash exists. If not, the administrator is presented with the option of creating a hard link. If /bin/hrbash does exist, the administrator may be presented other choices, such as the ability to review the existing profile, create a new profile on top of the old one, create a new profile under a different name (e.g., /bin/ceobash), etc.

At 206, it is determined whether the profile being generated is sufficient. In some embodiments, the profile is determined at 206 to be sufficient if the profile permits most to all of the activities that a user having the role embodied in role shell 112 is legitimately supposed to perform. As described in more detail below, one way of verifying whether a profile is sufficient is to run role shell 112 and perform assorted legitimate tasks, and then confirm that log 110 is free of access violations attributable to role shell 112.

At 208, the profile is refined. As described in greater detail below, one way of accomplishing this is to enter a learning mode in which attempts by the user to access files or other resources are logged, but attempts to access a file or other resource that the profile in its then current form does not allow are not blocked. In some embodiments, only access attempts the profile in its then current form does not allow are logged. In some embodiments, where possible, events are generalized, e.g., through interacting with an administrator, to refine the profile, e.g., by defining and/or modifying a (generalized, if possible) rule such that the observed access attempt would in the future be permitted under the profile. For example, in some embodiments for each event, where possible one or more generalizations of the event are suggested, offering the administrator the opportunity to choose to define a narrow rule that would permit the specific access attempt observed or a more general rule that would allow access to resources of a general class of which the specifically accessed resource is a member, e.g., by allowing access to all files in a particular library, as opposed to allowing access just to the specific file the application was observed to access.

The process ends at 210 when it is determined that the profile being generated is sufficient.

In some embodiments, the profile is updated if it is subsequently determined that additional functionality should be permitted (or denied) to a user associated with a role with which the profile is associated. For example, if a person working for the HR department were assigned a new function or task, such as performing helpdesk services, such as password resetting, in some embodiments the profile for the user's role would be updated to expressly allow access to the resources required to perform the new function or task. As described in more detail below, features of multiple roles can be combined in assorted ways.

Four example profiles for four roles are presented in conjunction with FIGS. 3A-3D. The first (FIG. 3A) is an HR role that can add and delete user accounts, but not manipulate them. The second (FIG. 3B) is a helpdesk role that can change user passwords and perform other helpdesk functions but can not add or delete users. The third (FIG. 3C) is a composition of the HR and helpdesk roles. The fourth (FIG. 3D) is an indirect composition of the HR and helpdesk roles. The profiles presented in conjunction with FIGS. 3A-3D are simplified and could easily be manually created by an administrator. A more sophisticated version of the HR role is given in conjunction with FIGS. 5 and 6.

FIG. 3A illustrates an embodiment of a profile. This profile is of the role shell, "/bin/hrbash" (302), and is a role that indicates, for example, that a user associated with the role works in the human resources department. To enforce the profile against a user having an HR role, the user's default login shell is set to /bin/hrbash. Whenever the user accesses resources, their activities will be constrained by the profile associated with their role shell.

The profile shown in FIG. 3A includes information such as a list of files that a user having role shell /bin/hrbash may access (304), and the corresponding operations the user may perform (306) on those files. The access controls granted to a user having a particular role shell are sometimes referred to collectively as the "domain" of activities that a user having that role shell is authorized to perform.

In this example, read (denoted "r") and execute access (denoted "x") have been granted to role shell hrbash itself (308), allowing a user to spawn multiple instances of the shell as needed. As described in more detail below, in some embodiments the additional instances of the shell will also be confined. The shell is also permitted read and execute access to two additional files, in this case programs /usr/sbin/useradd (which can be used to create a new user) and /usr/sbin/userdel (which can be used to delete a user). As described in more detail below, programs, such as useradd, may also have profiles confining their behavior. Also as described in more detail below, various methods may be used to specify the type of execute access that may be granted.

The profile shown in FIG. 3A has three #includes (310). A "#include" is a directive that can be used to simplify a profile such as by either abstracting common tasks, or using chunks of other programs. For example, abstractions can include access to authentication mechanisms, graphics requirements, and system accounting. The administrator can also define abstractions.

Here, the first, "standard/base" is a set of file access permissions that are needed by many programs, such as read permission for glibc. The second, "standard/consoles" helps programs run correctly whether started at a console, a graphical interface, etc. The third, "standard/nameservice" includes accesses required to do user name lookups, DNS lookups, etc.

FIG. 3B illustrates an embodiment of a profile. This profile is of the role shell, "/bin/helpbash" (312), and is a role that indicates, for example, that a user associated with the role works at a helpdesk. In this profile, read and execute access is granted to /usr/bin/passwd (which can be used to change a user's password), and /usr/sbin/usermod (which can be used, for example, to change a user's home directory, shell, etc.). In this profile, no access is granted to the useradd or userdel programs.

FIG. 3C illustrates an embodiment of a profile. This profile (314) combines the permitted activities of both the HR role and the helpdesk role. Specifically, the accesses to /usr/sbin/useradd and /usr/sbin/userdel (316), and the accesses to /usr/bin/passwd and /usr/sbin/usermod (318) that were granted in the profiles depicted in FIGS. 3A and 3B, respectively, are included.

FIG. 3D illustrates an embodiment of a profile. This profile (316) also combines the permitted activities of both the HR role and the helpdesk role. Here, however, a layer of indirection is used. Access is granted to the respective role's shells (/bin/hrbash and /bin/helpbash), which in turn allow access to their respective contents.

FIG. 4A illustrates an embodiment of a program profile. In this example, the program being profiled is "passwd," which can be used to set the password of a user. This program is authorized for use by a person associated with the helpdesk role (FIG. 3B) and/or either of the composite roles (FIGS. 3C and/or 3D).

In this example, read, write, and link (and unlink) access (denoted "1") to the files /etc/npasswd (402) and /etc/nshadow (404) has been granted. Shell globbing can also be used to denote resources. For example, read, write, and link access has also been granted for any file in the /etc/ directory that has a prefix of "pwd." (406). Write access, only, has been granted to /etc/.pwd.lock (408). When "passwd" is called, it is restricted to accessing the above files with the above listed modes (and similarly, the other files listed in the profile with their respective access modes).

FIG. 4B illustrates an embodiment of a program profile. In this example, the program being profiled is "useradd," which can be used to create a new user. Commands such as useradd and usermod can theoretically be used to create unconstrained root accounts. Special programs, such as "confineduseradd" and "confinedusermod" may be included in system 100 that enforce policy with respect to such things as what kind of user accounts can be created, what their uid may be, what their default shell can be, and what profile is associated with that shell. These are special cases because the right to add and manipulate users can be conceptualized as a right to create privileges.

FIG. 5 illustrates an example interaction with an analyzer. The interaction depicted in this example will produce a role shell for the HR shell that is more comprehensive than the one shown in FIG. 3A. At 502, an administrator indicates that the role shell "/bin/hrbash" should be profiled. This corresponds with portion 202 of FIG. 2. A hard link is created from /bin/hrbash to /bin/bash, corresponding with portion 204 of FIG. 2.

At 504, the administrator is invited to perform tasks that a person having an HR role would be authorized to execute. In this example, the administrator executes authorized HR tasks in a learning mode, where violations of the profile are logged in a log 110, such as /var/log/messages. These logged events represent authorized behavior, unless the administrator through mistake or otherwise executes a task not authorized for the HR role.

In some embodiments, time markers, hashes, or other hints may be inserted into the log and checked for by the analyzer. These may be used, for example, to help the analyzer follow the execution of the application better, including by creating a tree of events, and other program executions, to create an impression of interactive behavior while profiling.

In some cases, the role's allowed behaviors may be run in conjunction with a comprehensive test suite or quality assurance (QA) cycle to best reflect how the role will be used in a production environment. If an administrator forgets to exercise key functionality, or new resources are required by the role after the profile has been created, the profile can be updated by repeating portion 208 of FIG. 2.

In some embodiments, profile generation is decoupled from testing. For example, for roles requiring significant access to many resources, the administrator can request that the QA department execute role tasks in learning mode. The log files can then be collected at the end of the QA test and sent back to the administrator or other entity. The profile refinement process can thus be conducted offline from the role being tested.

When the administrator is finished executing tasks expected to be performed by persons having the role, at 506, the administrator selects an option to parse the log for events. In this example, a default recommended option is enclosed in brackets and will be selected if the administrator hits a default key, such as the Enter key. Other choices may be selected by pressing the appropriate key, such as "F" (508) to end the dynamic analyzer. In other embodiments, other interfaces may be used as appropriate.

The administrator is now posed a series of questions that correspond to events logged in log 110 while tasks were executed in role shell 112 (510). This corresponds with portion 208 of FIG. 2. Some of the specific questions and simplifications described below are applicable only to a SUSE Linux platform. Other questions and simplifications can be used with other platforms as applicable.

For example, at 512, an event in the log indicates that the command, "useradd" was executed. The administrator is presented with several options to incorporate this into the hrbash profile, and a default suggestion is enclosed in brackets.

When execute access is granted, a variety of methods can be used to address what restrictions should apply to the resulting child process. In this example, the suggested option is that the child process inherit (514) the parent process's profile. This generally prevents the confined shell or application from "escaping" its access controls by executing an unrestricted child process, and is denoted in the resulting profile in some embodiments as mode "ix" (see, e.g., FIG. 6). In some cases, however, a child process may require different resources than the parent and other methods of determining what access to grant child processes can be used as appropriate.

For example, if a child has its own profile, a designation of "px" in the parent profile in some embodiments (e.g., as a result of selecting option 516) requires that the child's profile be used when the child is spawned. If "px" is required, but the child does not have a profile, the child is blocked from executing. In other embodiments, a child may run unconfined (denoted "ux" in the profile in some embodiments, see, e.g., FIG. 7) (518), or may inherit a profile specified by name or file location (denoted "@x" in some embodiments) (not pictured). In some embodiments, when a child process is encountered, the analyzer automatically causes a profile to be generated for the child if one does not exist.

"Deny" (520) prevents the shell from executing the specified program. "Abort" (522) ends the analysis, discarding changes. "Finish" (524) closes the analyzer, saving any changes made to the profile.

At 526, an event in the log indicates that the list directory contents command, "ls," was executed. The "ls" command is a very common system tool, used by many applications in a variety of ways. Allowing it (or other commands such as "mv," "grep," etc.) to be separately profiled could lead to an unstable system. Thus, in this example, the only option presented to the administrator is to "inherit" (528) the parent process's profile. The "profile" option is not presented.

At 530, an event in the log indicates that the capability, "chown," was used. In some embodiments, capabilities are the POSIX.1e draft capabilities. The administrator is presented with the options of allowing the role to have the chown capability (532) or to deny the role the capability.

At 534, an event in the log indicates that a non-executable file was accessed. The administrator selects a directory path (536), then the administrator selects a rule (538). In this example, the resource is a library file, "liblog_syslog.so.1.0.0," and the role shell requires read access to that resource.

The administrator's choices for permitting access to the library in this example include a first option that is a generalization that helps maintain compatibility when future versions of the library are installed (536), and a second option that would limit access to that specific library (540). Other globs can be suggested for aspects such as kernel module version numbers, process IDs (e.g., /proc/<pid>/output may be rewritten as /proc/*/output), usernames (for example, when paths look like user directories), locale files, time zone files, system fonts (and other directories which contain content for which when a single file is requested, access to the entire directory should be suggested, such as /etc/profile.d and /etc/sysconfig/powersave/), etc.

Several rules are presented. In this example, rules include the following: "Allow" grants the program access to the specified resource. "Deny" prevents the program from accessing the specified directory path entry. "Glob" modifies the directory path, for example by using wild cards to include all files in a directory, or other regular expressions (e.g., character alteration, arbitrary numbers of path elements, etc.) as desired. "Glob with extension" wildcards the filename in a path, while retaining the file extension. "New" allows the administrator to manually create a rule. "Abort" ends the log analysis, discarding changes. "Finish" closes the analyzer, saving any changes made to the profile.

At 542, an event in the log indicates that the name service switch configuration file, "/etc/nsswitch.conf," was accessed. In addition to allowing access to the file itself (544), an abstraction is presented to the administrator (546). Here, "abstractions/nameservice" allows accesses required to do user name lookups, DNS lookups, etc.

Program chunks can be used to allow local policies to be created while leaving the underlying profiles standardized across multiple servers. Other frameworks can also be used so that an administrator can easily add site-specific glob suggestions and site-specific include files that will be suggested if they match access requests.

At 548, an event in the log indicates that a temporary file, "/etc/passwd.tmp3gt91P," was accessed. In addition to allowing access to the file itself (550), a suggestion is made to allow access to all temporary files having the form "/etc/passwd.*" (552). To allow read access to all files of the form "/etc/passwd.tmp*," the administrator could select GlobWithExt. To specify a new rule, the administrator could select New and enter the desired rule.

In some embodiments, the list of generalizations that can/will be presented are stored in a single place, such as a file called logprof.conf, which can be readily modified by an administrator or user as applicable. In this example file, patterns and responses can be encoded so that when the dynamic profile generator sees a file access of "pattern," it will suggest a generalization of "response." The "response" can include such things as a glob generalization, a kind of execute permission to suggest (e.g., px, ix, or ux), or a directive not to profile a particular application.

When events are satisfied by existing profile elements, they are not presented to the administrator, whether they were in the profile at the beginning of the session, or whether they were recently added. When an administrator adds a rule that is a superset of one or more previous entries, the subsumed rules are removed from the profile.

FIG. 6 illustrates an embodiment of a profile. This profile, for /bin/hrbash, was created as the result of the analysis/interaction performed in conjunction with FIG. 5. In this example, the entries in the completed profile were alphabetized, as were the corresponding access modes. The decision made at 514 in FIG. 5 is recorded at 602. The decision made at 528 in FIG. 5 is recorded at 604. The decision made at 532 in FIG. 5 is recorded at 606. The decision made at 536 in FIG. 5 is recorded at 608. The decision made at 546 in FIG. 5 is recorded at 610.

FIG. 7 illustrates a portion of an embodiment of a program profile. In this example, the program profiled is the secure shell daemon, or "sshd" (702).

In some embodiments, access controls can be provided at the granularity of a single native process. Sub-process confinement is gained in some embodiments by using an API called change_hat( ). A confined process can call change_hat( ) to change its confinement to a sub-profile also referred to herein as a "hat."

In an application server platform, such as an Apache web server (with built-in execution environments such as mod_perl or mod_php, supporting the PERL and PHP programming languages, respectively), efficient execution of active server pages scripted in PERL, PHP, etc., can come at the expense of security because they all execute in a single process and in a single security domain. By using change_hat( ) each individual script can be executed in a security domain designed just for that script.

Here, the sshd profile makes use of change_hat( ). The EXEC hat (704) is the default subprofile, used when sshd has authenticated the user. The PRIVSEP hat (706) is a subprofile for handling network input. It is a privilege separated child, in that it has fewer privileges than the EXEC subprofile, so that attacks from unauthenticated users are more tightly confined. Other subprofiles also used, but not pictured, include a subprofile that handles authentication requests from the privilege separated child, and a subprofile for the post-authentication period that is used until the user's shell is spawned.

In some embodiments, questions such as "what roles may this user assume," "what resources can that role access," and "what resources can this user access by assuming all possible roles," can be answered by a graphical tool that computes the transitive closure of resources that can be accessed by starting from a given profile. "Transitive closure" means following the links of programs that can be executed from the root profile that have their own profile, and thus grant additional resources.

The graphical representation can be used to show the gatekeeping applications at each domain transition. For instance, a role foo may be able to access the domain for Sendmail, but only by executing the /bin/sendmail application. The sendmail application is thus acting as a gatekeeper to the resources in its profile, and so in principle is not allowing the foo role unqualified access to these resources, but rather is mediating access through the operations that sendmail is willing to perform. If the user with the foo role is an attacker, then they may have a powerful exploit against Sendmail that permits them to hijack the program and coerce it to perform arbitrary computations. The graphical transitive closure form allows arbitrary probabilities to be assigned to each for each gatekeeping application (e.g. high for Sendmail, lower for Postfix). The tool can multiply these probabilities together in a chain, allowing the analyst to assess the combined probability of a role being able to make arbitrary changes to a given file.

The ability to change a profile can be tantamount to total control over a machine. Example ways of providing security are as follows: Changing a profile requires two properties, (1) the administrator must be root, and (2) the administrator must not be constrained by a profile. This way, an exploitation of a confined process, even running with root's privileges, does not grant the ability to change policy. To allow a confined process mediated ability to change policy, the following requirements could be enforced: (1) The confined processes may execute a specific designated child process as unconstrained; (2) The unconstrained child, if run as root, can make arbitrary policy changes; (3) The unconstrained child is highly trusted software, e.g., small and carefully audited, and should perform appropriate authentication that the requested policy changes are well-formed; and (4) The use of the unconstrained child configuration is generally not permitted in conjunction with regular expressions, and is highlighted in red in SubDomain policy viewing/editing tools.

In some embodiments, the techniques and system described herein can be used to enforce local policy and delegate privileges to root accounts on local machines, e.g. by confining root to one of each of the predefined tasks listed below, or by confining root to some other role. These tasks include audit, restore, install (can create directories and files, etc.), configure (can modify existing files, etc.), start/stop (ability to run /etc/rc.d/* etc.), run-time execution identity (setting user-IDs of applications), administration privileges (e.g., an oracle DBA may have a different identity than the database itself, and has a different identity than the users), user data (roles for database users), and backup.

By making policy components composable, administrators can be given variable amounts of privilege, e.g., a sole administrator at a small site may have many different roles at his disposal, while several administrators at a larger site may engage in separation of duty and only have a few roles at each individual's disposal.

The tasks listed above (audit, restore, etc.) can be defined as compound capabilities. The start/stop role can be achieved by granting permission to execute /etc/rc.d/init.d/lpd to give start/stop capability on lpd. Backup capability can be granted by giving the local administrator access to a backup application (e.g. /usr/bin/amanda) which in turn has a profile that gives read access to the entire file system. Thus the administrator has the capability to back up the system, without having direct read access to all files.

In some embodiments, a policy agent is an unconfined program on each machine. Administrators of local machines are given a root shell account, but that shell is confined so that the administrator only has capabilities (for example, simple and compound) that are explicitly granted. In this embodiment, none of the files associated with the policy agent are directly accessible by local administrators, preserving the property that local administrators cannot appropriate capabilities for themselves.

Insider threats can occur where people who have explicit authorization abuse their access. This can be a particular problem where users are permitted to change policies, but also applies generally to the problem of access control, where people abuse access that they were granted. In some embodiments, this is addressed by devising programmable interprocess communications (IPC) filters, so that the kinds of activities that are permitted to flow across IPC channels can be specified. Such programmable filters can be made outboard, so that they can be developed and deployed independent of the basic software functionality (enabling rapid development and separate security enhancement) and can be tuned to particular enterprise installation and configuration (so that organizations don't need to modify source code to change security policy). These techniques can prevent insiders from misusing their access to corrupt enterprise resources in general, and enterprise access control policies in particular.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access control in a computer system arranged to include an operation system layer and an application layer, the method comprising:

loading a policy module within the operating system layer;

generating a profile associated with a role within an organization by analyzing with an analyzer tasks performed by a user associated with said profile using a role shell, and determining based upon said analyzing a set of rules that define said storing the profile within the policy module in the operating system layer;

enforcing the profile with respect to one or more users associated with the role;

associating the role shell with the role; and facilitating communication between the operating system and application layers using the role shell.

2. The method of claim 1 wherein generating the profile includes analyzing an authorized interaction with a protected resource, and creating said profile to ensure that the authorized interaction is not blocked in the future for the profile.

3. The method of claim 2 wherein the protected resource comprises an application and the profile defines one or more access controls associated with the application.

4. The method of claim 1 wherein the profile created is refined based at least in part on accesses logged in a log.

5. The method of claim 4 wherein the log is created non-contemporaneously with the refining of the profile.

6. The method of claim 4 wherein the log is created on a first platform and the profile is refined on a second platform.

7. The method of claim 1 wherein the profile uses shell globbing syntax.

8. The method of claim 1 wherein the profile is generated based at least in part upon rules determined by analyzing the user interaction with a resource.

9. The method of claim 8 wherein the user interaction includes providing questions to the user.

10. The method of claim 1 wherein the role shell comprises a hard link to a system shell.

11. The method of claim 1 wherein enforcing the profile includes constraining the role shell in accordance with the profile.

12. A system of providing access control comprising a processor, coupled to a memory, configured to:

load a policy module within an operating system layer;

generate a profile associated with a role by analyzing with an analyzer tasks performed by a user associated with said profile using a role shell, and determining based upon said analyzing a set of rules that define said profile;

enforce the profile with respect to one or more users associated with the role; store the profile in the policy module in the operating system layer;

associate the shell with the role; and facilitate communication between the operating system layer and an application layer using the role shell.

13. The system of claim 12 wherein the processor is configured to generate the profile at least in part by an authorized interaction with a protected resource, and creating said profile to ensure that the authorized interaction is not blocked in the future for the profile.

14. The system of claim 13 wherein the protected resource comprises an application and the profile defines one or more access controls associated with the application.

15. The system of claim 12 wherein the profile is generated based at least in part upon rules determined by analyzing the user interaction with a resource.

16. The system of claim 12 wherein the role shell comprises a hard link to a system shell.

17. The system of claim 12 wherein the processor is configured to enforce the profile at least in part by constraining the role shell in accordance with the profile.

18. A computer program product to provide access control, the computer program product being embodied in a computer readable medium and comprising computer instructions to:

load a policy module within an operating system layer;

generate a profile associated with a role by analyzing with an analyzer tasks performed by a user associated with said profile using a role shell, and determining based upon said analyzing a set of rules that define said profile;

store the profile in the policy module in the operating system layer of the computer;

associate the role shell with the role;

facilitate communication between the operating system layer and an application layer using the role shell; and enforce the profile with respect to one or more users associated with the role.

* * * * *